United States Patent [19]

Ueyama et al.

[11] Patent Number: 5,783,887
[45] Date of Patent: Jul. 21, 1998

[54] MAGNETIC BEARING SPINDLE DEVICE FOR MACHINE TOOLS

[75] Inventors: Hirochika Ueyama, Hirakata; Manabu Taniguchi, Kashihara, both of Japan

[73] Assignee: Koyo Seiko Co., Ltd., Osaka, Japan

[21] Appl. No.: 896,770

[22] Filed: Jul. 18, 1997

[30] Foreign Application Priority Data

Aug. 7, 1996 [JP] Japan .................. 8-208265

[51] Int. Cl.$^6$ .................................. H02K 7/09
[52] U.S. Cl. .................................. 310/90.5
[58] Field of Search .................. 310/68 B, 90.5; 451/364, 397, 402

[56] References Cited

U.S. PATENT DOCUMENTS

| | | | |
|---|---|---|---|
| 4,976,177 | 12/1990 | Fouche | 310/90.5 |
| 5,133,158 | 7/1992 | Kihara et al. | 51/165.77 |
| 5,523,701 | 6/1996 | Smith et al. | 324/772 |
| 5,573,443 | 11/1996 | Yasuda et al. | 451/11 |
| 5,666,014 | 9/1997 | Chen | 310/90.5 |

*Primary Examiner*—Clayton E. LaBalle
*Attorney, Agent, or Firm*—Reid & Priest LLP

[57] ABSTRACT

A magnetic bearing spindle device for machine tools comprises a spindle for mounting a tool element as changeably attached to a forward end thereof, a plurality of controllable magnetic bearings for contactlessly supporting the spindle, an electric motor for rotating the spindle as contactlessly supported by the magnetic bearings, a draw bar inserted through the spindle and axially movable for unclamping and clamping the tool element, state sensor switches for detecting the axial position of the draw bar to detect a state of having no tool element, an unclamping state or a clamping state, and a control unit for controlling the support of the spindle by the magnetic bearings and the rotation of the spindle by the motor based on the result of detection by the switches.

4 Claims, 2 Drawing Sheets

MAGNETIC BEARING SPINDLE DEVICE FOR MACHINE TOOLS

BACKGROUND OF THE INVENTION

The present invention relates to magnetic bearing spindle devices for machine tools, and more particularly to a magnetic bearing spindle device wherein a spindle for mounting a tool element as changeably attached to its forward end is rotatable by rotating drive means, as contactlessly supported by a plurality of controllable magnetic bearings.

Machine tool spindle devices such as machining centers are already known in which a spindle for carrying a tool element as changeably attached to its forward end is rotatably supported by antifriction bearings. With such a spindle device, the tool element is automatically changed by an automatic tool changer provided on the machine tool. The spindle has inserted therethrough a draw bar movable axially of the spindle for clamping the tool element to be attached to the forward end and unclamping the tool element. The draw bar clamps the tool element by being moved to a rearward clamping position by a spring and unclamps the tool element by being moved to a forward unclamping position by a pusher against the force of the spring. The draw bar is in an unclamping state when moved to the unclamping position, in a clamping state in which the bar as moved to the clamping position holds the tool element actually clamped, or in a state in which the bar clamps no tool element although moved toward the clamping position. The tool element is changed by moving the draw bar to the unclamping position with the spindle held out of rotation to unclamp the tool element which is so far clamped, replacing the element by an alternative tool element and thereafter moving the draw bar to the clamping position to clamp the alternative tool element. On completion of change of the tool element, a command for rotation is given by the machine tool to rotate the spindle.

For use with machine tools, magnetic bearing spindle devices have been proposed in recent years in which a spindle is contactlessly supported by controllable magnetic bearings and thereby made rotatable at a higher speed. Such devices usually comprise a spindle for mounting a tool element thereon, a plurality of controllable magnetic bearings (e.g., an axial magnetic bearing and two radial magnetic bearings) for contactlessly supporting the spindle axially and radially thereof, an electric motor for rotating the spindle, a controller for controlling the magnetic bearings and the motor, and touchdown bearings (protective bearings) for restricting the axial and radial movable ranges of the spindle and mechanically supporting the spindle when the spindle is not supported by the magnetic bearings.

Although the automatic tool changer comprising a draw bar and described above has not been used in magnetic bearing spindle devices for machine tools, the spindle device encounters the following problem if incorporating the tool changer.

The tool element to be automatically changed is attached to a holder having a contour in common with other holders for tool elements, and is changed as attached to the holder. Accordingly, the spindle differs considerably in overall weight when equipped with the tool element (clamping state) and when equipped with no tool element (unclamping state or in a state having no tool element). This varies the natural frequency of the entire spindle. On the other hand, the control characteristics of the magnetic bearings of the spindle device are so adjusted as to be optimum with the tool element attached to the spindle, so that if it is attempted to rotate the spindle as contactlessly supported by the magnetic bearings with no tool element attached to the spindle, the spindle will vibrate, for example, with the natural frequency of the entire spindle and will not always be supportable with good stability. Further if an attempt is made to rotate the spindle with the tool element attached thereto improperly, the tool element is likely to slip off.

SUMMARY OF THE INVENTION

An object of the present invention is to provide a magnetic bearing spindle device for machine tools which is adapted to preclude the vibration of the spindle or the removal of the tool element that would occur when the spindle is rotatable as contactlessly supported by magnetic bearings with no tool element attached to the spindle or with the tool element attached thereto incompletely.

The prevent invention provide a magnetic bearing spindle device for machine tools which comprises a spindle for mounting a tool element as changeably attached to a forward end thereof, a plurality of controllable magnetic bearings for contactlessly supporting the spindle, rotating drive means for rotating the spindle as contactlessly supported by the magnetic bearings, and a draw bar inserted through the spindle and axially movable for unclamping and clamping the tool element, the spindle device being characterized in that the device comprises a tool state sensor means for detecting the axial position of the draw bar to detect a state of having no tool element, an unclamping state or a clamping state, and control means for controlling the support of the spindle by the magnetic bearings and the rotation of the spindle by the drive means based on the result of detection by the sensor means.

The position of the draw bar varies with the unclamping state, the clamping state and the state of having no tool element. Accordingly, the particular state of the draw bar, i.e., one of these states, can be detected by detecting the axial position of the draw bar. The spindle can therefore be prevented from vibrating by controlling the support of the spindle by the magnetic bearings and the rotation of the spindle by the drive means based on the result of detection, for example, by not effecting the support by the magnetic bearings and not rotating the spindle in the unclamping state in which no tool element is mounted on the spindle or in the state of having no tool element. Unless the tool element is mounted properly even if clamped, the draw bar is in the unclamping state or in the state of having no tool element, so that when mounted incompletely, the tool element can be precluded from slipping off similarly by not effecting the support by the magnetic bearings and not rotating the spindle in the unclamping state or in the absence of tool element.

Preferably, the control means makes it impossible for the magnetic bearings to support the spindle and for the drive means to rotate the spindle when the result of detection by the sensor means is the state of having no tool element or the unclamping state, or permits the magnetic bearings to support the spindle and the drive means to rotate the spindle when the result of detection by the sensor means is the clamping state.

This eliminates the likelihood that the spindle will be supported contactlessly or rotated with no tool element attached to the spindle or with a tool element incompletely mounted thereon, consequently precluding the spindle from vibrating while no tool element is mounted on the spindle or preventing the tool element as mounted incompletely from slipping off.

3

For example, the draw bar has a flange for use in detecting the position thereof, and the tool state sensor means comprises three state sensors for detecting the state of the draw bar by detecting the flange of the draw bar.

The draw bar in the state having no tool element, in the unclamping state or in the clamping state is detectable reliably by the three sensors.

Each of the state sensors is, for example, a proximity switch.

The flange of the draw bar is reliably detectable by the proximity switch to detect the state of the draw bar reliably.

DESCRIPTION OF THE PREFERRED EMBODIMENT

An embodiment of the invention for use in machine tools, for example, as a machining center will be described below with reference to the drawings.

Figure 1:
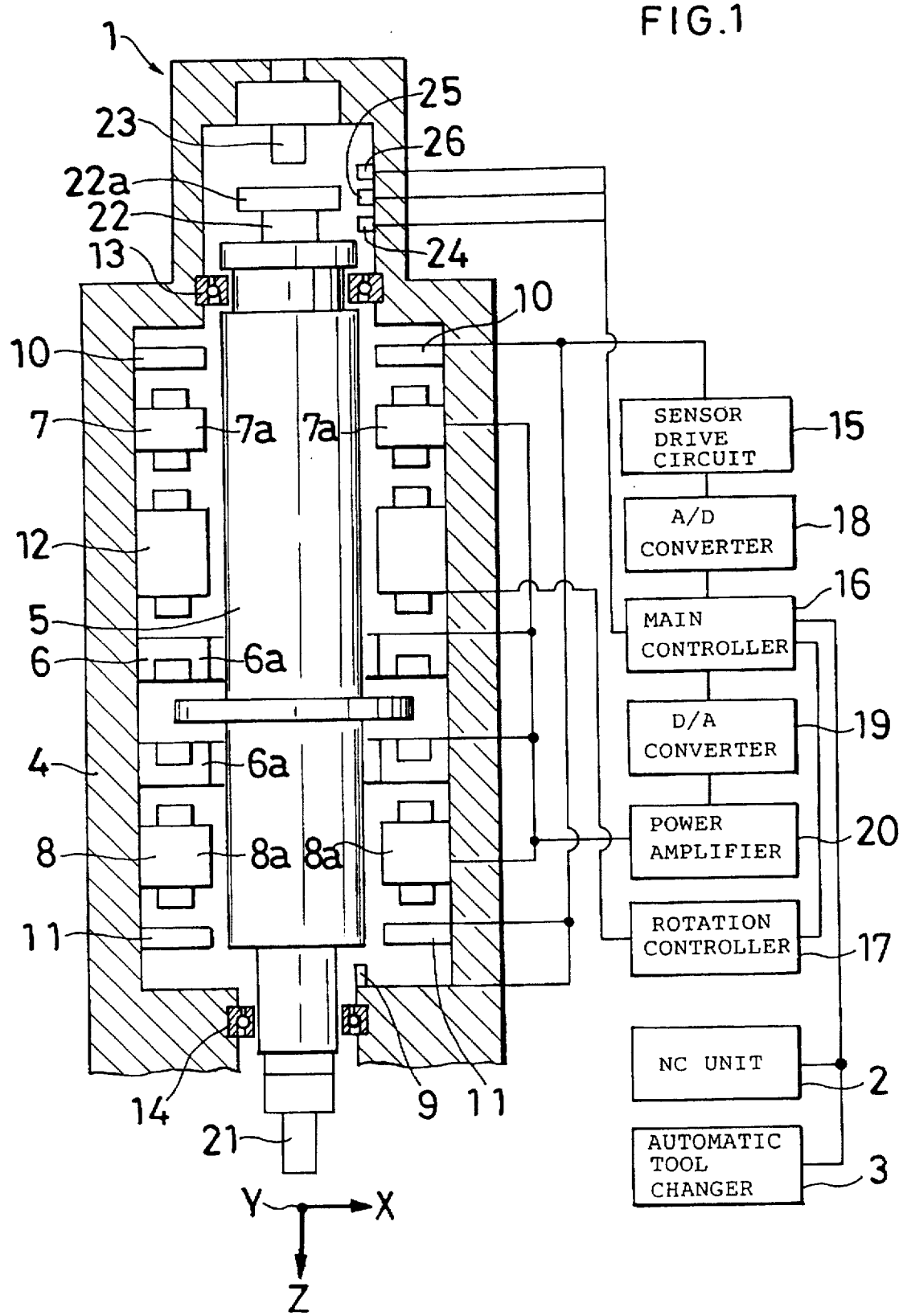
FIG. 1 is a diagram schematically showing the construction of a magnetic bearing spindle device embodying the invention for use in machine tools.
Figure 2:
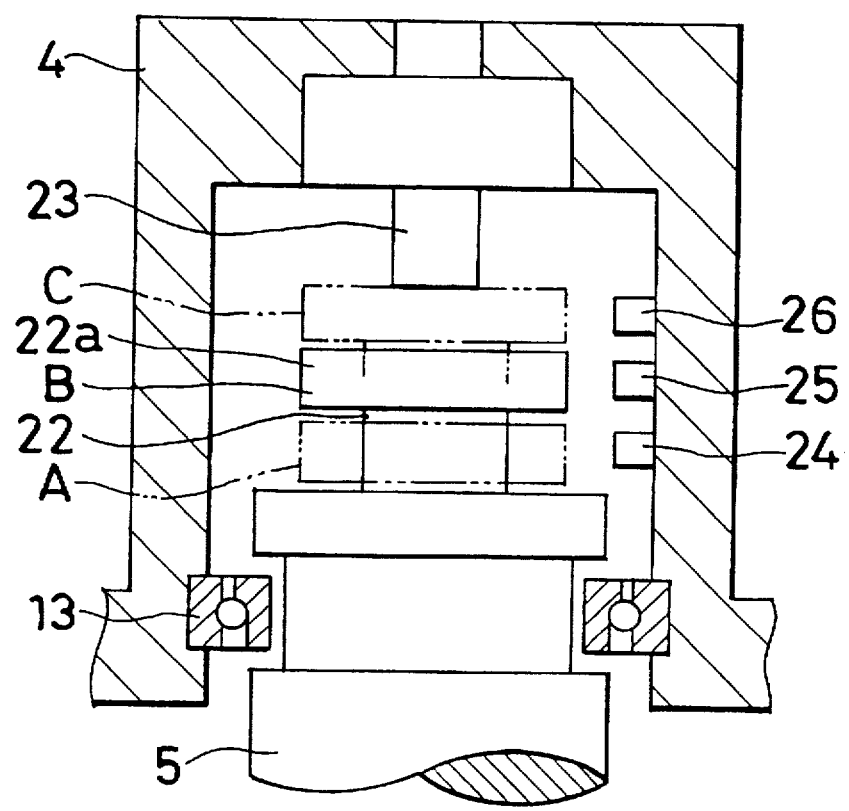
FIG. 2 is an enlarged fragmentary view of FIG. 1.

FIG. 1 schematically shows a magnetic bearing spindle device 1, a numerical control unit (hereinafter referred to as the "NC unit") 2 serving as means for controlling the working operation of a machine tool, and an automatic tool changer 3 serving as automatic tool changing means. FIG. 2 shows a portion of the spindle device 1 on an enlarged scale.

The spindle device 1 is of the vertical type and has a spindle 5 vertically disposed within a casing 4. Further provided inside the casing 4 are controllable magnetic bearings for contactlessly supporting the spindle 5, i.e. an axial magnetic bearing 6 and upper and lower two radial magnetic bearings 7, 8, an axial position sensor 9 for detecting the axial displacement of the spindle 5, upper and lower two sets of radial position sensors 10, 11 for detecting the radial displacement of the spindle 5, a high-frequency electric motor 12 serving as rotating drive means for rotating the spindle 5 at a high speed, and upper and lower two touchdown bearings 13, 14 serving as means for restricting the axial and radial movable ranges of the spindle 5 and mechanically supporting the spindle 5 in contact therewith when the spindle 5 is not supported by the magnetic bearings 6, 7, 8.

Usually, the axial magnetic bearing 6 comprises a pair of electromagnets 6a opposed to each other axially of the spindle, and each of the radial magnetic bearings 7, 8 comprises electromagnets 7a (8a) in two pairs in two respective radial directions orthogonal to each other. In the following description, the two radial control axes (horizontal axes) orthogonal to each other will be referred to respectively as X-axis and Y-axis, and the axial control axis (vertical axis) orthogonal to these axes as Z-axis. Of the electromagnets 7a, 8a of the radial magnetic bearings 7, 8 and the radial position sensors 10, 11, those arranged along X-axis only are shown in FIG. 1. The magnetic bearings 6, 7, 8 and the position sensors 9, 10, 11 are known and therefore will not be described in detail.

The axial position sensor 9 and the radial position sensors 10, 11 are driven by a sensor drive circuit 15. The sensor drive circuit 15 detects the displacements of the spindle 5 in the axial direction (Z-axis direction) and in the radial directions (X-axis direction and Y-axis direction) based on the outputs of the sensors 9, 10, 11 and outputs analog position detection signals with respect to the respective control axis directions. The position sensors 9, 10, 11 and the sensor drive circuit 15 provide means for detecting the axial and radial displacements of the spindle 5.

The spindle device 1 further comprises a main controller 16 and a rotation controller 17 as control means for controlling the magnetic bearings 6, 7, 8 and the electric motor 12. The main controller 17 controls the magnitude of the exciting currents to be supplied to the electromagnets 6a, 7a, 8a of the magnetic bearings 6, 7, 8 based on the axial and radial displacements of the spindle 5, causes the rotation controller 17 to control the rotation of the motor 12 and consists mainly of a digital signal processor. The term digital signal processor refers to specific hardware adapted to receive digital signals and deliver digital signals, is programmable by software and processes digital signals at a high speed in real time. The rotation controller 17 controls the rotation of the motor 12 in accordance with a command from the main controller 16 and comprises a known inverter.

The analog position detection signals from the sensor drive circuit 15 are converted by an A/D converter 18 into digital position detection signals, which are then fed to the main controller 16. The main controller 16 controls the magnitude of the exciting currents to be supplied to the electromagnets 6a, 7a, 8a of the magnetic bearings 6, 7, 8 based on the digital position detection signals, i.e., based on the axial and radial displacements of the spindle 5. Thus, the main controller 16 delivers digital control signals, which are converted by a D/A converter 19 into analog control signals. A power amplifier 20 supplies exciting currents to the respective electromagnets 6a, 7a, 8a based on the analog control signals, with the result that the spindle 5 is contactlessly supported in position with respect to the axial and radial directions by being attracted by the electromagnets 6a, 7a, 8a. The exciting currents supplied to each pair of electromagnets 6a, 7a, 8a of the bearings 6, 7, 8 along the control axis are each a constant steady-state current equal to the other and plus a control current controlled according to the position of the spindle 5.

A tool element 21 joined to a holder is attached to the forward end (lower end) of the spindle 5. Inserted through the spindle 5 is a draw bar 22 serving as tool clamp means for unclamping and clamping the tool element 21 with the axial movement of the spindle 5. The draw bar 22 has a rear end (upper end) projecting upward beyond the rear end of the spindle 5 and integrally formed with a flange 22a for use in detecting the position of the bar. Although not shown, a forward end portion of the draw bar 22 inside the spindle 5 is provided with a clamp for holding the tool element 21, and the draw bar 22 is biased rearward (upward) by a disk spring disposed inside the spindle 5. The clamp of the draw bar 22 is opened by the forward movement of the draw bar 22 and closed by the rearward movement of the bar 22. Disposed at the rear end of the casing 4 is a pusher 23 serving as means for moving the draw bar 22 forward against the force of the spring. When the pusher 23 is advanced to a forward limit position, the draw bar 22 is moved to a forward limit position, i.e., an unclamping position indicated at A in FIG. 2. This opens the clamp, unclamping the tool element 21 so far clamped and making the tool element 21 removable. The draw bar 22 is moved to an intermediate position, i.e., a clamping position indicated at B in FIG. 2, by fitting the tool element 21 to the clamp in the unclamping state and retracting the pusher 23. This closes the clamp, causing the clamp to hold the tool element 21 to mount the element 21 on the spindle 5. If the pusher 23 is retracted with no tool element fitted to the clamp in the unclamping state, the draw bar 22 moves to a rearward limit position, i.e., a tool absent position indicated at C in FIG. 2, to close the clamp with no tool element. The tool element 21 is changed by moving the draw bar 22 to the unclamping position as described above, with the spindle 5 held out of rotation and supported by the touchdown bearings 13, 14 and with the magnetic bearings 6, 7, 8 held unenergized, replacing the tool element 21 by an alternative tool element and moving the draw bar 22 to the clamping position. The tool is thus changed automatically by the automatic tool changer 3 in response to a tool number command from the NC unit 2. The automatic tool changer 3 is known and therefore will not be described in detail. The tool number command from the NC unit 2 is given also to the main controller 16.

Provided inside the casing 4 are three state sensors for detecting the state of the draw bar 22 by detecting the flange 22a of the draw bar 22, i.e., a first sensor 24 for detecting the bar 22 in the unclamping state, a second sensor 25 for detecting the bar in the clamping state and a third sensor 26 for detecting the absence of the tool element. These sensors 24, 25, 26 each comprise, for example, a proximity switch. The first sensor 24 is turned on only when the draw bar 22 is in the unclamping position A, the second sensor 25 is on only when the draw bar 22 is in the clamping position B, and the third sensor 26 is on only when the draw bar 22 is in the tool absent position C. The sensors 24 to 26 provide tool state sensor means.

The output of the sensor 24, 25 or 26 is fed to the main controller 16, which in turn controls the support of the spindle 5 by the magnetic bearings 6, 7, 8 and the rotation of the spindle 5 by the motor 12 based on the output of the sensor 24, 25 or 26, i.e., based on the state of the draw bar 22 detected. The main controller 16 renders the spindle 5 supportable by the magnetic bearings 6, 7, 8 and rotatable by the motor 12 when the draw bar 22 in the clamping state while making it impossible for the magnetic bearings 6, 7, 8 to support the spindle 5 and for the motor 12 to rotate the spindle 5 when the draw bar 22 is in the unclamping state or in the state of having no tool element. For example, when the draw bar 22 is in the clamping state on completion of tool element changing, the magnetic bearings 6, 7, 8 are immediately energized to contactlessly support the spindle 5. Alternatively, the bearings 6, 7, 8 are energized for the contactless support of the spindle 5 when a rotation command is given by the NC unit 2 first after the draw bar 22 is brought into the clamping state upon completion of tool element changing. The spindle 5 is rotated by driving the motor 12 when a rotation command is output from the NC unit 2 while the draw bar 22 is in the clamping state. The characteristics of the magnetic bearings 6, 7, 8 under the control of the main controller 16 are so adjusted as to be optimum when the spindle 5 is equipped with the tool element 21. While no tool element is mounted on the spindle 5, i.e., while the draw bar 22 is in the unclamping state or in the state of having no tool element, the magnetic bearings 6, 7, 8 are held unenergized so as not to support the spindle 5 contactlessly despite a command from the NC unit 2, and the motor 12 is held out of operation to hold the spindle 5 at rest even if a rotation command is given by the NC unit 2. Consequently, the spindle 5 is held out of rotation as supported by the touchdown bearings 13, 14. With no tool element mounted on the spindle 5, the difference due to the weight of the tool element 21 alters the overall weight and natural frequency of the spindle 5. Since the control characteristics of the magnetic bearings 6, 7, 8 are so adjusted as to be optimum when the spindle 5 is equipped with the tool element 21 as described above, the control characteristics of the bearings 6, 7, 8 are not always optimum when no tool element is mounted on the spindle 5. If the spindle 5 is rotated as contactlessly supported by the bearings 6, 7, 8 in this state, the spindle 5 is likely to vibrate. However, the spindle device 1 described is free of such a problem since the device is so adapted that the spindle 5 is not supported contactlessly, nor is it rotated when equipped with no tool element. Further if the tool element 21 is attached to the spindle 5 incompletely despite a clamping movement, the draw bar 22 assumes the unclamping state or the state of having no tool element, and the spindle is not supported contactlessly and is held out of rotation in this state as described above. This eliminates the likelihood of the tool element slipping off.

What is claimed is:

1. A magnetic bearing spindle device for machine tools which comprises a spindle for mounting a tool element as changeably attached to a forward end thereof, a plurality of controllable magnetic bearings for contactlessly supporting the spindle, rotating drive means for rotating the spindle as contactlessly supported by the magnetic bearings, and a draw bar inserted through the spindle and axially movable for unclamping and clamping the tool element, the spindle device being characterized in that the device comprises a tool state sensor means for detecting the axial position of the draw bar to detect a state of having no tool element, an unclamping state or a clamping state, and control means for controlling the support of the spindle by the magnetic bearings and the rotation of the spindle by the drive means based on the result of detection by the sensor means.

2. A magnetic bearing spindle device for machine tools as defined in claim 1 which is characterized in that the control means makes it impossible for the magnetic bearings to support the spindle and for the drive means to rotate the spindle when the result of detection by the sensor means is the state of having no tool element or the unclamping state, or permits the magnetic bearings to support the spindle and the drive means to rotate the spindle when the result of detection by the sensor means is the clamping state.

3. A magnetic bearing spindle device for machine tools as defined in claim 1 which is characterized in that the draw bar has a flange for use in detecting the position thereof, and the tool state sensor means comprises three state sensors for detecting the state of the draw bar by detecting the flange of the draw bar.

4. A magnetic bearing spindle device for machine tools as defined in claim 3 which is characterized in that the state sensors are each a proximity switch.

* * * * *